Dec. 6, 1938.   G. E. MILLER   2,139,029
HOP PICKING MACHINE
Filed June 15, 1938    4 Sheets-Sheet 1
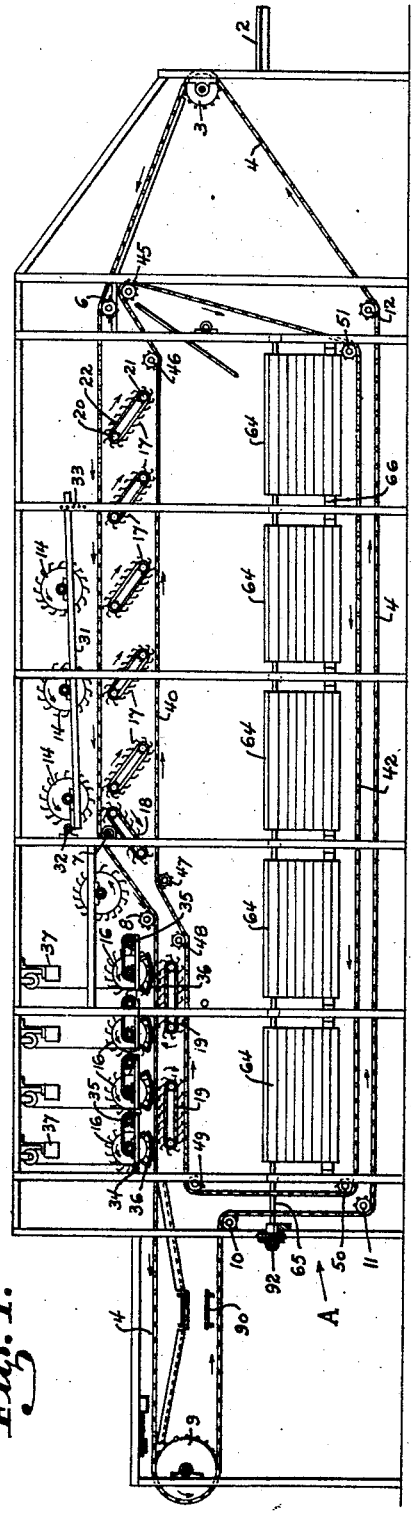
INVENTOR.
George E. Miller.
BY
Chas. E. Townsend.
ATTORNEY.

Dec. 6, 1938.　　　　G. E. MILLER　　　　2,139,029

HOP PICKING MACHINE

Filed June 15, 1938　　　4 Sheets-Sheet 2

INVENTOR.
George E. Miller.
BY
Chas. E. Townsend.
ATTORNEY.

Dec. 6, 1938.     G. E. MILLER     2,139,029
HOP PICKING MACHINE
Filed June 15, 1938     4 Sheets-Sheet 3
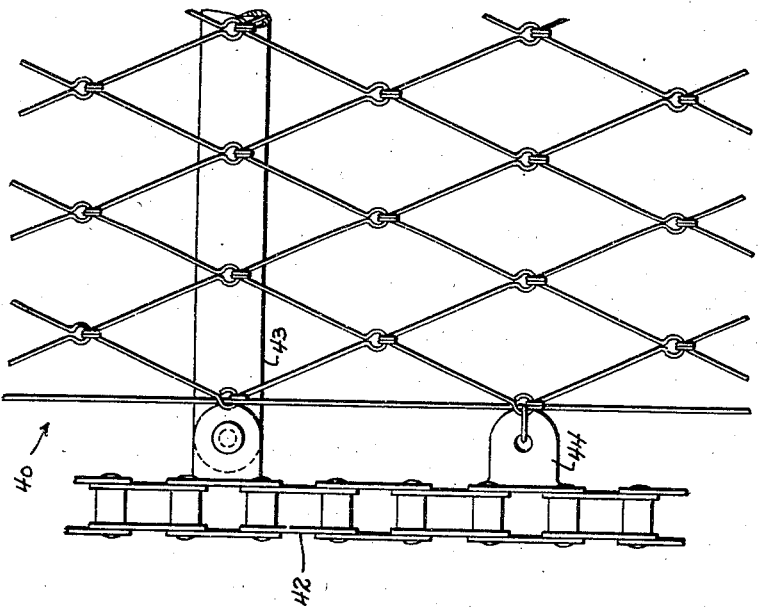
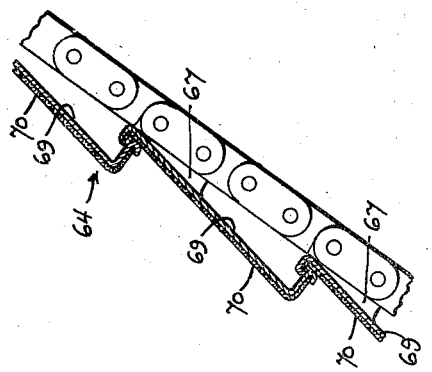
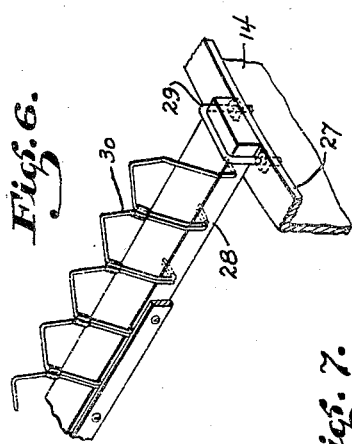
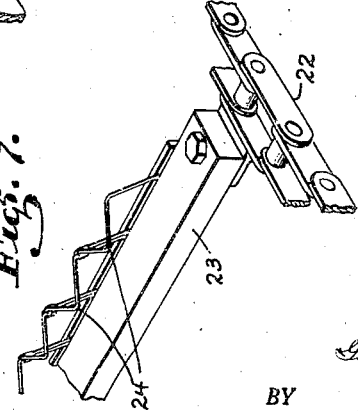
INVENTOR.
George E. Miller.
BY
Chas. E. Townsend.
ATTORNEY.

Dec. 6, 1938.    G. E. MILLER    2,139,029
HOP PICKING MACHINE
Filed June 15, 1938    4 Sheets-Sheet 4
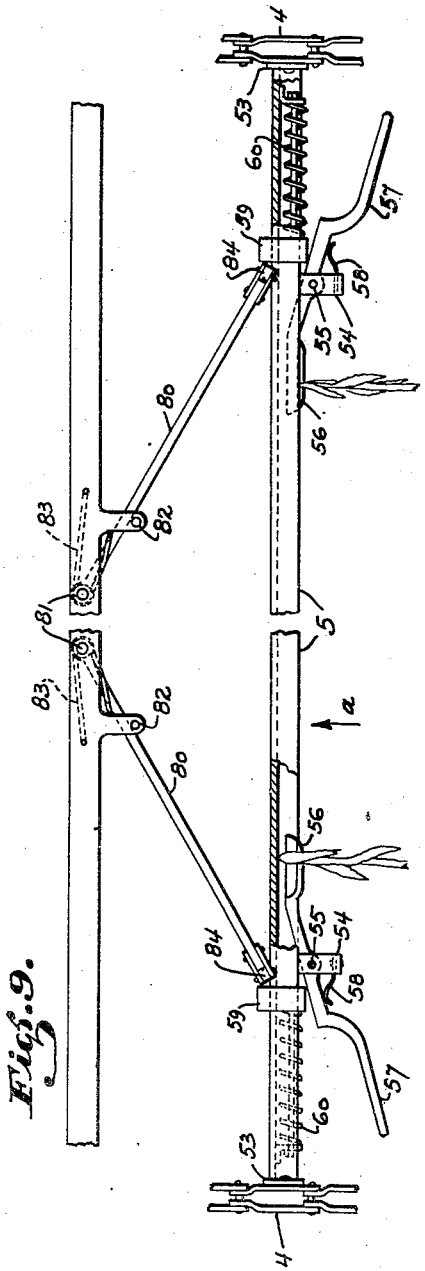
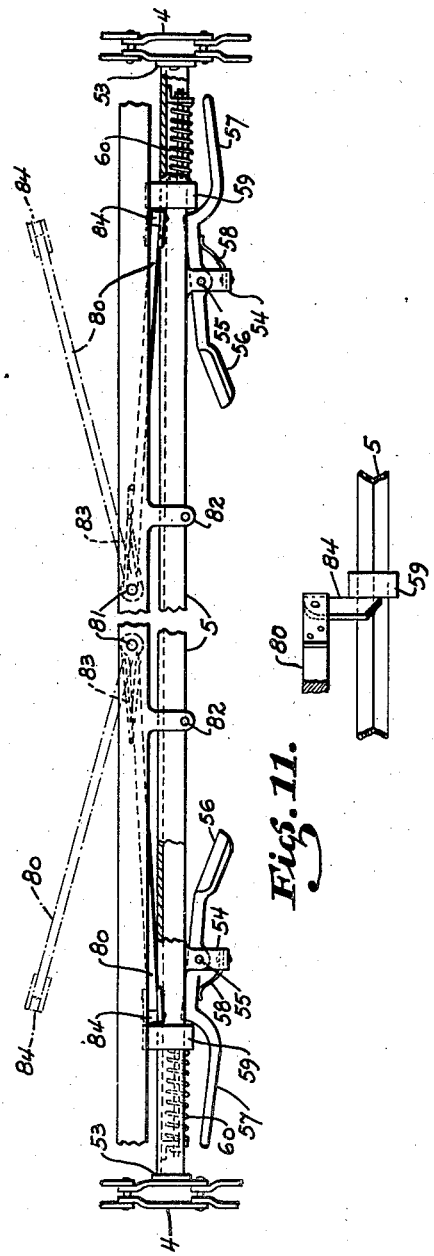
INVENTOR.
George E. Miller.
BY
Chas. E. Townsend.
ATTORNEY Patented Dec. 6, 1938

2,139,029

UNITED STATES PATENT OFFICE 2,139,029

HOP PICKING MACHINE

George E. Miller, Sacramento, Calif.

Application June 15, 1938, Serial No. 213,897

5 Claims. (Cl. 130—30)

This invention relates to a hop picking machine, and especially to improvements in the construction and operation thereof.

The object of the present invention is generally to improve and simplify the construction and operation of hop picking machines; to provide a machine which will not only pick or remove the hops from the vines, but also from arms and clusters broken and pulled off the vines during the picking operation; to provide a machine which employs belts and cooperating drums mounted above them, said belts and cooperating drums being provided with picking fingers which comb the vines from opposite sides to remove the hops; to provide an endless flexible diamond-meshed wire screen belt which is disposed below the picking belts, and cooperates therewith, to pick arms and break up clusters; to provide a machine which is divided into two picking zones, one zone in which the picking fingers are comparatively widely separated and where the major portion of the hops are removed, and a second zone in which the picking fingers are closely spaced to strip the vines of the remaining hops; to provide a picking machine which provides almost immediate liberation or removal of the hops from the picking zones, so as to prevent damage or breakage of the hops after they have been removed from the vines by the picking fingers; to provide a picking machine which tends to flatten out and spread the vines as they pass through and between the picking fingers, so as to insure a more thorough picking or removal of the hops; to provide means for separating the hops from leaves which are accidentally removed during the picking operation; and further, to provide means for automatically releasing and removing the vines from the machine when picked.

The hop picking machine is shown by way of illustration in the accompanying drawings, in which Fig. 1 is a central, vertical, longitudinal section of the machine;

Fig. 2 is a side elevation of the machine showing the drive;

Fig. 5 is a plan view of a portion of the diamond-meshed wire screen belt;

Fig. 6 is a perspective view showing a portion of one of the ends, and one of the finger bars, of a picking drum;

Fig. 7 is a perspective view showing a portion of the chain and a portion of a finger bar forming a picking belt;

Fig. 8 is an enlarged section of a portion of the separator belt;

Fig. 9 is a plan view of the grasper bar and vine releasing means, said view showing vines held by the grasper and the releasing means ready to open grasper and release the vines;

Fig. 10 is a plan view similar to Fig. 9, but showing graspers in full release by the releasing means.

Fig. 11 is a view in elevation, showing the latch of the releasing bar.

Figures 3, 4:
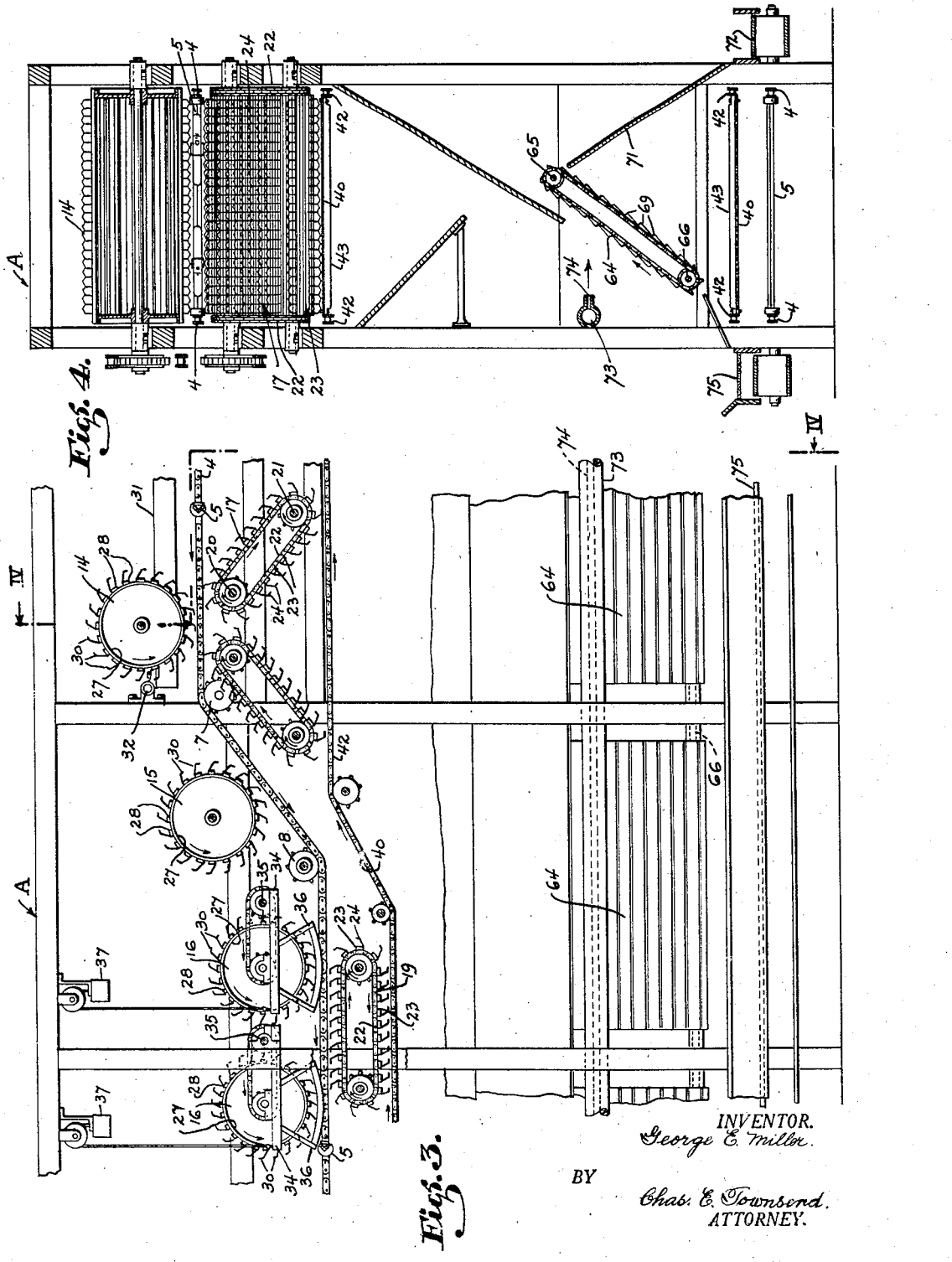
Fig. 3 is an enlarged longitudinal vertical section of the center portion of the machine.
Fig. 4 is a cross section taken on line IV—IV of Fig. 3.

Referring to the drawings in detail, and particularly to Figs. 1 and 2, A indicates an elongated frame, on the front end of which is mounted a feeding platform 2. Just above the platform is journaled a shaft 3, on which is mounted a pair of sprocket gears, and carried by said sprocket gears is a pair of endless chains 4. These chains are spaced apart approximately the width of the frame, and between the chains are secured vine grasper bars 5 which will hereinafter be described.

The chains 4 pass from the sprockets in an upward direction, and then over an idler sprocket 6. The chains then pass rearwardly through the frame over an idler sprocket 7, then down and under an idler sprocket 8, then to the rear end of the machine where they pass over idler sprockets 9, then forwardly again over idler sprockets 10, then downwardly and over idler sprockets 11. The chains then run underneath the frame, throughout its entire length, to the forward end, and pass under idler sprockets 12 and then finally over sprockets 3. The chains 4, together with the grasper bars 5 secured between them, form an endless carrier whereby the vines to be picked are pulled through the machine. During the passage of the vines through the machine, they first pass under a series of picking drums indicated at 14, then under a drum 15, and finally under a series of drums 16 which will hereinafter be referred to as the "grilling drums".

During this passage they pass beneath the drums and at the same time over a series of picking belts indicated at 17, 18 and 19. The picking belts are constructed as follows: Upper and lower shafts 20 and 21 (see Fig. 3) extend crosswise of the frame and are journaled thereon. A pair of sprocket gears are placed under each shaft and are spaced apart substantially the width of the frame, and over these sprockets pass chains 22. Secured to the chains and arranged crosswise thereof are bars 23 on which are secured V-shaped wire picking fingers 24. The sprocket chains 22 are shown in Figs. 3 and 7, and so are the crossbars 23 and the picking fingers 24. All of the picking belts indicated at 17 are identical in construction, and so is the belt 18 and the two sets of belts indicated at 19. All the belts 17 are disposed on an incline with their highest ends disposed in the path of travel of the chains or carrier 4. The picker belt 18 is also inclined, but is placed in a position reverse to the picking belt 17. The belts 19 are horizontally disposed, and their purpose will hereinafter be described.

The picking drums are best shown in Figs. 3 and 6. Shafts extend crosswise of the frame, and on each end are mounted drum heads 26. These drum heads are flanged as at 27 to support a series of finger bars 28, these bars being secured by U-bolts or the like which extend through the flanges 27 as indicated at 29. Each bar carries V-shaped wire picking fingers 30, and these are identical to the fingers 24 secured to the crossbars of the picking belts. The first three drums 14 are mounted on a pair of bars 31 pivoted at the point 32. The forward end of the bar is adjustable with relation to the frame by passing bolts 33 through the frame and the bars, and in this manner it is possible to raise the three drums 14 with relation to the carrier or chains 4, so as to increase the spacing between the drums and the vines which are being pulled through. In as much as the pivotal point of the drums 31 is located at 32, the first drum will assume the widest spacing, and the rest of the drums a less and less spacing; the drum 15 is still closer spaced, and the grilling drum 16 is the final and closest spaced. They are mounted on bars 34 pivoted at their forward ends as at 35. Each bar carries a cam-shaped shoe 36, and as a grasper bar passes under, the cams will raise the bars 34 about the pivots 35 so as to permit the grasper bars to pass by; that is, the cams raise the drums 16 sufficiently to permit a free passage of the grasper bars, but the moment the grasper bar passes, they drop back and thus assume a close spacing which insures stripping and final picking of the vines. The drums are counterweighted as shown at 37; by adjusting the counterweights, for instance by using buckets filled with shot or the like, it is possible to apply any weight desired between the grilling drums and the vines.

Below the picking belts 17, 18 and 19 runs another belt generally indicated at 40. This belt is best illustrated in Fig. 5. It consists of a pair of spaced chains 42 which are spaced apart by spacer bars 43. Supported by the spacer bars and by lugs 44 is a diamond-meshed wire belt. This is maintained in a taut condition by the spacer bars, and it cooperates with the picker belts 17, 18 and 19 to pick arms and to break up clusters of hops, as will hereinafter be described. The diamond-mesh belt is an endless belt and is supported by sprockets 45, 46, 47, 48, 49, 50 and 51.

The vine grasper bars to which the vines are attached when they are to be pulled through the machine are best shown in Figs. 9 and 10. These bars are made of angle iron and are secured between the chains 4 by lugs or similar means, as indicated at 53. Adjacent each end of a grasper bar are bearing lugs 54, and pivoted thereon as at 55 are grasper levers 56 having handles 57. Springs 58 carried by the bearing lugs 54 normally hold the grasping levers in the position shown in Fig. 10. In this position an operator standing on the platform 2 can hook a vine over the end 56 of the lever by merely forming a loop at the butt end of the vine. When he has hooked the loop over the end 56, he grasps the lever 57 and pulls it toward him. In doing so, a sliding collar 59 is released and shoots in under the arm to assume the position shown in Fig. 9, being moved to this position by means of a spring 60. The grasping levers are disposed one adjacent each end of the grasper bar, and as they are identical in construction and operation, the description of one should suffice.

There are two operators or feeders standing on platform 2, and their duty is to form a loop in the end of a hop vine and to hook it over the grasping levers 56 and then to pull the levers so as to force the loop into the grasper bar where it will be clamped by the ends 56 and secured when the collars 59 are wedged under the levers by means of the spring 60. In this position two vines will be pulled through the machine, and will first pass over the two first picking belts 17 and over the belt 18, then down under the drum 15 and finally over the belts 19 and under the drums 16. The drums 16, as previously stated, are so closely spaced with relation to the belts 19 that the grasper bars cannot pass through. It is for this reason that cams 36 are placed on the drums, and the drums mounted on the levers 34, so that they may swing and rise out of the way when the grasper bar passes through, but they immediately drop back into picking position. The spacing between the first drum 14 and the adjacent picking belt 17 is the greatest, but as the vine advances the spacing becomes less and less until the final spacing is very small between the drum 16 and the picker belts 19. The vine is thus thoroughly combed as it passes between the drums and the several picker belts by means of the V-shaped wire fingers 24 and 30, and as the spacing decreases, the fingers enter deeper and deeper into the vines and they are thoroughly combed and thoroughly stripped and cleaned as they pass from and under the drum 16.

The inclined position of the picker belts 17 is important. For instance, if the average length of a hop vine is 12 feet, then the spacing between the upper end of the belt 17 will be from 6 to 8 feet. Thus, as the vine is being dragged through, it will drop down from the first picking belt 17 to the second one, and when it passes over that it will drop onto the third one, and so on. This drop of the vine from one picking belt to the other as it is being pulled over the same shakes up the vine and spreads it out, and this permits more thorough picking. Also, it shakes free hops which are combed out from the upper surface of the vines by the drums 14.

Practically all hops which are removed by the picker belts 17, 18 and 19 will fall and lodge between the fingers 24, and rest on the crossbars 23, which are closely spaced, in fact so close as to practically form an endless continuous floor. In this position the hops are protected from any damage, as there is no mechanism that can contact them, strike them or crush them, but as the belts 17, 18 and 19 travel in the direction of the arrows indicated, the hops will fall out when they pass around the lower sprockets. They will thus be deposited on the diamond-mesh belt 40, but as the meshes therein are large, they will immediately drop through and will be received by a series of separator belts generally indicated at 64.

The separator belts are best shown in Figs. 1, 4 and 8. There are five of them illustrated, but this number may be increased or decreased depending upon the length of the machine. Upper and lower shafts 65 and 66 extend through the machine. Pairs of upper and lower sprockets are fixed on these shafts, and two endless chains are employed for each belt. These chains are provided with lugs 67 (see Fig. 8), and to the lugs are secured plates 69 which are covered with burlap 70, or a similar material. The plates are arranged in step-like form, and when the hops are deposited thereon, they will jump from step to step, as the steps are fairly steeply inclined. Leaves and other foreign material, on the other hand, are flat and will tend to rest on the step-like surfaces, and as such will be carried upwardly by the separator belts and discharged on the rear side to deflector plates 71 which deliver them to a refuse conveyor 72. An air pipe extends the length of the machine, as indicated at 73. This has a slotted face 74, and an air blast is thus directed against the belt, and this further assists in urging leaves and like foreign material to adhere to the separator belt and to move upwardly with the same. The hops themselves are fairly round or oval in shape and they roll readily, and for this reason the separator belts are fairly steeply inclined, so that the hops will readily roll down and be received by a conveyor belt 75 which will carry them to a dry kiln or other suitable storage place.

In hop picking machines as heretofore built, a stationary diamond-mesh screen has been employed for picking broken arms and for breaking up clusters of hops. In this instance the diamond-mesh screen is continuously traveling in the direction of the arrows (see Fig. 1), and as it passes around a number of pulleys or sprockets, flexibility is essential. It is for this reason that the diamond-mesh belt is constructed as shown in Fig. 5; that is, it consists of V-shaped lengths having an eye in the V to receive and connect the several lengths. This makes a flexible belt and at the same time a belt which cooperates with the fingers of the belts 17, 18 and 19 to pick the hops from arms which are broken or pulled off the vines, and also to break up clusters of hops which may have been pulled off when the vines passed between the drums 14 and the belts 17, etc.

After the vine finally passes the grilling drums 16, the grasper arms 56 are automatically opened, and the picked vines are removed. The mechanism employed is best illustrated in Figs. 9 and 10. It consists of a pair of arms 80 pivoted as at 81 to the frame of the machine. Stop-pins 82 limit the movement of the arms in one direction, and springs 83 surrounding the pivotal points maintain the arms in the full-line position shown. On the outer end of each arm is a pivoted latch 84. These latches will engage the collars 59 when the grasper bar approaches the discharge end of the machine, and as the bar travels in the direction of arrow $a$ (see Figs. 9 and 10), the arms will swing about their pivots 81 and as the latches 84 engage the collars, the collars will be pushed outwardly and finally permit the springs 60 to open the grasper arms and release the vines. At the point of release a transverse conveyor belt 90 is disposed. This belt has long spokes on its surface, and as the vines drop they are engaged by the spokes, and the picked vines are discharged at one side or another of the machine, or carried to any convenient point.

The manner in which the several belts here shown are driven is best illustrated in Fig. 2. In this view, a shaft 92 is the drive shaft. The chain 93 passes over a sprocket 9a, and this drives the shaft upon which the sprockets 9 are supported. This in turn drives the endless carrier to which the grasper bars are secured. Another drive chain 94 is driven from the shaft 92, and this drives the shafts of the several picking belts, and also the drums 14 and 15, an auxiliary chain 15a being provided to drive the drums, and being driven off an intermediate drive shaft 15b. The drums 16 are driven from the shafts indicated at 16a, but as they are mounted on the pivoted levers 34, these levers swing on the shaft 16a, and they carry a separate drive to each drum.

While certain features of my invention have been more or less specifically described and illustrated, I nevertheless wish it understood that changes may be resorted to within the scope of the appended claims, and that the specific materials and finish of the several parts employed may be such as the manufacturer desires or varying conditions demand.

Having thus described and illustrated my invention, what I claim and desire to secure by Letters Patent is—

1. A hop picking machine comprising a frame, a plurality of revolving drums mounted in the frame, a plurality of belts disposed below the drums, said belts and drums being provided with picking fingers, a carrier traveling lengthwise of the frame between the picking drums and belts, and means on the carrier for grasping one end of a hop vine and for pulling it through the machine between the picking drums and belts, said belts being inclined with their highest ends in the direction of travel of the carrier and vine, and being spaced apart in the direction of travel to permit the vine to drop each time it passes the high point of a picker belt, whereby the vine is spread out to permit thorough picking of the hops.

2. A hop picking machine comprising a frame, a plurality of revolving drums mounted in the frame, a plurality of belts disposed below the drums, said belts and drums being provided with picking fingers, a carrier traveling lengthwise of the frame between the picking drums and belts, means on the carrier for grasping one end of a hop vine and for pulling it through the machine between the picking drums and belts, said belts being inclined with their highest ends in the direction of travel of the carrier and vine, and being spaced apart in the direction of travel to permit the vine to drop each time it passes the high point of a picker belt, whereby the vine is spread out to permit thorough picking of the hops and a continuously traveling diamond-mesh flexible wire belt disposed below the picking belts to receive broken arms and clusters torn from the vine, said belt cooperating with the picking fingers on the picking belts to cause hops to be combed from the broken arms and to tear apart clusters of hops.

3. A hop picking machine comprising a frame, a plurality of revolving drums mounted in the frame, a plurality of belts disposed below the drums, said belt and drums being provided with picking fingers, a carrier traveling lengthwise of the frame between the picking drums and belts, means on the carrier for grasping one end of a hop vine and for pulling it through the machine between the picking drums and belts, said belts being inclined with their highest ends in the direction of travel of the carrier and vine, and being spaced apart in the direction of travel to permit the vine to drop each time it passes the high point of a picker belt, whereby the vine is spread out to permit thorough picking of the hops; a diamond-mesh flexible wire belt disposed below the picking belts to receive broken arms and clusters torn from the vine, means for driving said belt in a direction opposite to the movement of the picking fingers on the picking belts to cause the diamond-shaped meshes of the wire belt to oppose the fingers on the picking belts and thereby remove the hops from the broken arms and to tear apart clusters of hops, and means disposed below the wire belt for separating picked hops from leaves and other foreign matter removed from the vines during the picking operation.

4. A hop picking machine comprising a frame, a plurality of revolving drums mounted in the frame, a plurality of belts disposed below the drums, said belts and drums being provided with picking fingers, a carrier traveling lengthwise of the frame between the picking drums and belts, means on the carrier for grasping one end of a hop vine and for pulling it through the machine between the picking drums and belts, said belts being inclined with their highest ends in the direction of travel of the carrier and vine, and being spaced apart in the direction of travel to permit the vine to drop each time it passes the high point of a picker belt, whereby the vine is spread out to permit thorough picking of the hops, and means for adjusting the position of the picking drums with relation to the picking belts to gradually decrease the spacing between the same as the vine to be picked advances through the machine.

5. A hop picking machine comprising a frame, a plurality of revolving drums mounted in the frame, a plurality of belts disposed below the drums, said belts and drums being provided with picking fingers, a carrier traveling lengthwise of the frame between the picking drums and belts, means on the carrier for grasping one end of a hop vine and for pulling it through the machine between the picking drums and belts, said belts being inclined with their highest ends in the direction of travel of the carrier and vine, and being spaced apart in the direction of travel to permit the vine to drop each time it passes the high point of a picker belt, whereby the vine is spread out to permit thorough picking of the hops, means for adjusting the position of the picking drums with relation to the picking belts to gradually decrease the spacing between the same as the vine to be picked advances through the machine, means for automatically releasing the vine after passage through the machine, and other means for removing the vine.

GEORGE E. MILLER.